(12) United States Patent
Hershko et al.

(10) Patent No.: US 8,799,470 B2
(45) Date of Patent: Aug. 5, 2014

(54) SYSTEM AND METHOD USING A CLIENT-LOCAL PROXY-SERVER TO ACCESS A DEVICE HAVING AN ASSIGNED NETWORK ADDRESS

(75) Inventors: Yuval Corey Hershko, Haifa (IL); Nir Strauss, Yokneam Moshava (IL)

(73) Assignee: Qualcomm Incorporated, San Diego, CA (US)

( * ) Notice: Subject to any disclaimer, the term of this patent is extended or adjusted under 35 U.S.C. 154(b) by 102 days.

(21) Appl. No.: 13/415,604

(22) Filed: Mar. 8, 2012

(65) Prior Publication Data

US 2013/0067085 A1    Mar. 14, 2013

Related U.S. Application Data

(60) Provisional application No. 61/452,031, filed on Mar. 11, 2011, provisional application No. 61/588,007, filed on Jan. 18, 2012, provisional application No. 61/588,030, filed on Jan. 18, 2012.

(51) Int. Cl.
*G06F 15/16* (2006.01)

(52) U.S. Cl.
USPC .......................................... 709/225; 709/227

(58) Field of Classification Search
USPC .......................... 709/200–203, 217–227, 228
See application file for complete search history.

(56) References Cited

U.S. PATENT DOCUMENTS

| | | | |
|---|---|---|---|
| 6,185,616 B1 | 2/2001 | Namma et al. | |
| 6,456,854 B1 | 9/2002 | Chern et al. | |
| 6,493,551 B1 | 12/2002 | Wang et al. | |
| 6,526,033 B1 | 2/2003 | Wang et al. | |
| 6,587,882 B1 | 7/2003 | Inoue et al. | |
| 6,594,254 B1 | 7/2003 | Kelly | |
| 6,603,761 B1 | 8/2003 | Wang et al. | |
| 7,016,328 B2 | 3/2006 | Chari et al. | |
| 7,155,521 B2 | 12/2006 | Lahti et al. | |
| 7,269,165 B2 | 9/2007 | Karino | |
| 7,366,840 B2 | 4/2008 | Tapola | |

(Continued)

FOREIGN PATENT DOCUMENTS

| | | |
|---|---|---|
| CA | 2632510 A1 | 1/2009 |
| GB | 2418321 A | 3/2006 |
| WO | 02073921 A2 | 9/2002 |

OTHER PUBLICATIONS

International Search Report and Written Opinion—PCT/US2011/028536—ISA/EPO—Jun. 14, 2012.

(Continued)

*Primary Examiner* — Moustafa M Meky
(74) *Attorney, Agent, or Firm* — Kilpatrick Townsend & Stockton LLP (57) ABSTRACT

A communications system includes a mobile computing device having a dynamic address and mobile web server software. A client-local proxy-server has an IP address to which a web client can reliably and consistently establish an internet connection. In response to receiving a request from the web client to access the mobile computing device, the client-local proxy-server acts as an intermediary opening up a communications path between the web client and the assigned address of the mobile computing device. The mobile computing device repeatedly registers the current version of its address with the client-local proxy-server. The mobile computing device and proxy-server software require only targeted configuration changes to perform the disclosed intermediary routing operations.

18 Claims, 3 Drawing Sheets

(56) References Cited

U.S. PATENT DOCUMENTS

| | | | |
|---|---|---|---|
| 7,523,491 B2 | 4/2009 | Dosa Racz et al. |
| 7,620,001 B2 | 11/2009 | Ganji |
| 7,729,366 B2 | 6/2010 | Mok et al. |
| 8,085,891 B2 | 12/2011 | Owen |
| 8,311,042 B2 | 11/2012 | Nath et al. |
| 8,438,285 B2 | 5/2013 | Brown et al. |
| 8,443,420 B2 | 5/2013 | Brown et al. |
| 2003/0018710 A1 | 1/2003 | Choi |
| 2003/0037254 A1 | 2/2003 | Fischer et al. |
| 2003/0056207 A1 | 3/2003 | Fischer et al. |
| 2004/0139227 A1 | 7/2004 | Takeda |
| 2004/0179537 A1* | 9/2004 | Boyd et al. ............... 370/395.54 |
| 2004/0203752 A1 | 10/2004 | Wojaczynski et al. |
| 2005/0010656 A1 | 1/2005 | Lee |
| 2005/0015584 A1 | 1/2005 | Takechi et al. |
| 2005/0018624 A1 | 1/2005 | Meier et al. |
| 2005/0043938 A1 | 2/2005 | Viken et al. |
| 2005/0114895 A1 | 5/2005 | Ismail et al. |
| 2005/0165909 A1 | 7/2005 | Cromer et al. |
| 2005/0246414 A1 | 11/2005 | Barda |
| 2006/0080404 A1 | 4/2006 | Haber-Land-Schlosser et al. |
| 2006/0154662 A1 | 7/2006 | Kil et al. |
| 2006/0195506 A1 | 8/2006 | Deng |
| 2006/0200503 A1 | 9/2006 | Dosa et al. |
| 2006/0200541 A1 | 9/2006 | Wikman et al. |
| 2007/0047585 A1 | 3/2007 | Gillespie et al. |
| 2007/0160001 A1 | 7/2007 | Lovegren et al. |
| 2007/0165579 A1 | 7/2007 | Delibie et al. |
| 2007/0180081 A1 | 8/2007 | Okmianski et al. |
| 2007/0197260 A1 | 8/2007 | Randall et al. |
| 2007/0214209 A1 | 9/2007 | Maeda |
| 2008/0005290 A1 | 1/2008 | Nykanen et al. |
| 2008/0123624 A1 | 5/2008 | Strandell et al. |
| 2008/0166997 A1 | 7/2008 | Sun et al. |
| 2008/0248834 A1 | 10/2008 | Chatterjee et al. |
| 2008/0313255 A1 | 12/2008 | Geltner et al. |
| 2009/0036111 A1 | 2/2009 | Danford et al. |
| 2009/0106366 A1 | 4/2009 | Virtanen et al. |
| 2009/0150904 A1 | 6/2009 | Champagne et al. |
| 2009/0222438 A1 | 9/2009 | Strandell et al. |
| 2009/0228545 A1 | 9/2009 | Mendez et al. |
| 2010/0015916 A1 | 1/2010 | Holcman et al. |
| 2010/0131583 A1 | 5/2010 | Lee et al. |
| 2010/0178953 A1 | 7/2010 | Blewett et al. |
| 2010/0211563 A1 | 8/2010 | Macchietti et al. |
| 2010/0211637 A1 | 8/2010 | Borzsei et al. |
| 2010/0215035 A1 | 8/2010 | Jeng Yen |
| 2010/0330976 A1 | 12/2010 | Berna Fornies et al. |
| 2011/0145391 A1 | 6/2011 | Ivershen |
| 2012/0210205 A1* | 8/2012 | Sherwood et al. ............ 715/234 |
| 2013/0047020 A1 | 2/2013 | Hershko et al. |
| 2013/0067026 A1 | 3/2013 | Hershko et al. |
| 2013/0067084 A1 | 3/2013 | Hershko et al. |
| 2013/0067086 A1 | 3/2013 | Hershko |
| 2013/0074108 A1* | 3/2013 | Cline et al. ........................ 725/5 |

OTHER PUBLICATIONS

Blandford, Rafe, Previewing Nokia's Mobile Web Server, Jun. 18, 2007, 11 pages, http://www.allaboutsymbian.com/features/item/Previewing_Nokias_Mobile_Web_Server.php.

Nokia, Overview from Mobile Web Server, 2010, 2 pages, http://research.nokia.com/page/231.

Kawamura, S. et al., End-to-End Mobility Management: A Two-Phase Deployment Scheme for Personal Use. International Conference on Wireless Networks, 2004, p. 1-6, See p. 4 col. 2, (ICWN-4).

* cited by examiner

SYSTEM AND METHOD USING A CLIENT-LOCAL PROXY-SERVER TO ACCESS A DEVICE HAVING AN ASSIGNED NETWORK ADDRESS

CLAIM OF PRIORITY UNDER 35 U.S.C. §119

The present Application for Patent claims priority to the following:
Provisional Application No. 61/452,031 entitled "REMOTE MOBILE ADMINISTRATION AND LOGGING USING HTTP PROTOCOL," filed Mar. 11, 2011, and assigned to the assignee hereof and hereby expressly incorporated by reference herein;
Provisional Application No. 61/588,007 entitled "REMOTE ACCESS AND ADMINISTRATION OF DEVICE CONTENT AND CONFIGURATION USING HTTP PROTOCOL," filed Jan. 18, 2012, assigned to the assignee hereof, and expressly incorporated by reference herein;
Provisional Application No. 61/588,030 entitled "SYSTEM AND METHOD USING A CLIENT-LOCAL PROXY-SERVER TO ACCESS A DEVICE HAVING AN ASSIGNED ADDRESS," filed Jan. 18, 2012, and assigned to the assignee hereof and hereby expressly incorporated by reference herein.

REFERENCE TO CO-PENDING APPLICATIONS FOR PATENT

The present Application for Patent is related to the following co-pending U.S. Patent Applications:
U.S. patent application Ser. No. 13/415,636, entitled "REMOTE ACCESS AND ADMINISTRATION OF DEVICE CONTENT AND CONFIGURATION USING HTTP PROTOCOL," by Yuval Corey Hershko and Nir Strauss, filed concurrently herewith, assigned to the assignee hereof, and expressly incorporated by reference herein; and
U.S. patent application Ser. No. 13/415,614, entitled "SYSTEM AND METHOD USING A WEB PROXY-SERVER TO ACCESS A DEVICE HAVING AN ASSIGNED NETWORK ADDRESS," by Yuval Corey Hershko and Nir Strauss, filed concurrently herewith, assigned to the assignee hereof, and expressly incorporated by reference herein.
U.S. patent application Ser. No. 13/415,581, entitled "SYSTEM AND METHOD USING FOR ACCESSING A DEVICE HAVING AN ASSIGNED NETWORK ADDRESS," by Yuval Corey Hershko and Nir Strauss, filed concurrently herewith, assigned to the assignee hereof, and expressly incorporated by reference herein.

FIELD OF DISCLOSURE

The disclosed embodiments are directed in general to accessing devices operating in a communications network. More specifically, the disclosed embodiments are directed to systems and methods for locating, routing to and accessing a device over an internet protocol (IP) network, wherein the device address can change.

BACKGROUND

In a communications network, an address is an identifier assigned to each device on the network. As applied to the internet, a device's address is known generally as its "Internet Protocol address" (IP address), which is a numerical representation of the device's virtual location on the internet. If the device hosts a website, the host device's IP address is used to locate the host device and provide access to content from the website. For example, the web domain google.com actually represents a numerical IP address, which could be, for example, 73.14.213.99. When web clients type in a domain name at their web browsers, a downstream DNS system matches or routes the entered domain name to an IP address, then uses the numerical IP address to locate and provide access to the host server device associated with that address.

A device's IP address is typically assigned to it by an entity in the network. For example, in a CDMA network the address assigning entity is the Packet Data Serving Node (PDSN). IP addresses may be assigned statically or dynamically. Static IP addressing schemes assign one IP address for one customer/device, and dynamic IP addressing schemes assign different IP addresses to a given customer/device at selected or random intervals. For example, some Internet Service Providers (ISP) assign a different IP address to a given customer each time the customer logs on to their computer. A website on a host device that has a static, unique IP address is accessed reliably and maintains stable client-server sessions. By contrast, under a dynamically assigned IP addressing scheme computers will likely have to share IP addresses with other computers on that network. Thus, hosting a website at a dynamically assigned IP address tends to compromise how reliably web clients can access the dynamically assigned address, as well as the stability of client-server sessions established between a web client and the dynamically assigned address.

It is desirable to provide a way to route web clients to a wider variety of web enabled computing devices, thereby allowing remote web-based access to content and features from a greater number of devices. More specifically, it would be advantageous to utilize dynamically addressed, mobile computing devices (e.g., mobile phones, PDAs, tablets and the like) as web servers that are accessible to a web client over an IP network with the same simplicity, stability and reliability that one might route to and access website content at a statically addressed web server. For example, as the technology of PDAs and smart phones improves, users store more and more information on these devices. The increase is both with respect to the quantity of the information and the range of its types. For example, types can include, but are not limited to, historical and current physical location, video, music and other multimedia files, word processing documents, and contact lists, as well as various interactive games.

However, as has been known to users and to persons of ordinary skill in the mobile device application arts, users that wish to share the information on their mobile devices have a limited set of options. The user can, for example, e-mail selected files to the intended recipients. The e-mail with its attachment(s) can then be sent through one or more of the mobile device's links to the Internet, for example through cellular wireless uplink to the cellular wireless network, and then through its interface to the Internet, or a Wi-Fi link to a local access point to the Internet. The e-mail attachment means of sharing files, however, can have substantial limitations. One such limitation is that it requires that the user have physical possession of the mobile device and, further, it generally requires direct action by the user, e.g., selecting and attaching the file, as well as filling in the addressee list of the e-mail message.

Alternatively, the user can post selected files from the user's mobile device to the user's social network page, e.g., Facebook® or MySpace®. However, employing these social networks as a means for sharing files on a user's mobile device has many of the same requirements, and limitations, as the e-mail sharing means. For example, every time the user decides to share a file that is only on his or her mobile device, the user must have physical possession of that device. It also requires that the user manually performs the uploading and posting of the files. In addition, social networks can impose limits on the kinds of files that can be accessed, as well as on the human interface mechanism. One conventional method for a mobile device user to share files stored on the device is to upload the selected files to a "cloud" disk, such as Apple® Mobile Me or Apple iCloud®, using for example the same links described for the social network posting. However, this method also requires that the user have physical possession of the mobile device every time he or she wishes to share a file.

The presence of a dynamic addressing scheme is a significant impediment to accessing content over an IP network from mobile computing devices such as mobile phones and wireless PDAs. As previously described, in networks such as CDMA, UMTS, GPRS, Wi-Fi and the like, mobile phones and wireless PDAs are not assigned static, routable IP addresses. Instead, their addresses are dynamically assigned and may change at regular or random times for any number of reasons primarily related to the network's requirements and the device's mobility and wireless connection. Because of the many complex and proprietary systems in IP and private networks, it is expected that attempts within or across such networks to access and retrieve content located at a dynamically addressed device would require considerable expense, engineering man-hours and design complexity, as well as access to and modification of proprietary systems such as DNS servers, custom gateways and complex tunneling configurations.

This disclosure describes various exemplary embodiments that provide, among other features and benefits, systems and methods to route web clients to a device having an assigned address that can change. The disclosed embodiments can also, among other additional features and benefits, assist in minimizing expense, engineering man-hours, design complexity and the need for access to proprietary systems by utilizing commercially available systems, and making targeted and relatively easily implemented configurations within those commercially available systems.

SUMMARY

Exemplary embodiments of the invention are directed to systems and method for accessing a device having an assigned address, comprising storing the assigned address in a memory location, and receiving at a client-local proxy-server a request to access the device. The request comprises a device identifier that uniquely identifies the device. In response to receiving the request to access the device, the device's stored address is identified based on the device identifier, wherein the client-local proxy-server acts as an intermediary to establish a data path between a sender of the request and the stored address.

The disclosed system facilitates the use of mobile web server software at the mobile computing device, whereby a sender can reliably access the mobile web server software even though the mobile computing device address is dynamic and can change. The disclosed embodiments implement the disclosed system using commercially available components (e.g., mobile web server software and web clients) and making targeting configuration-type changes (e.g., adding scripts, extensions and the like) to certain components.

BRIEF DESCRIPTION OF THE DRAWINGS

The accompanying drawings are presented to aid in the description of disclosed embodiments and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the terms "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Turning now to an overview of the relevant operating environment, the disclosed embodiments function in a conventional communication system that includes message/information transfer across and within both the public Internet and private networks. TCP (Transmission Control Protocol) and IP (Internet Protocol), known collectively as TCP/IP, are the basic communication protocols of the Internet. TCP/IP are often referred to as "lower layer" protocols because other so-called "higher layer" application protocols typically use TCP/IP to get to the Internet. Such higher layer application protocols include the World Wide Web's Hypertext Transfer Protocol (HTTP), the File Transfer Protocol (FTP), Telnet (Telnet), which lets users log-on to remote computers, and the Simple Mail Transfer Protocol (SMTP). These and other protocols are often packaged together with TCP/IP as a "suite." Because TCP/IP can be used as communications protocols in both the public Internet and private networks, virtually all computers and other similar devices with direct access to the public Internet communicate and exchange messages/information using a TCP/IP program.

TCP/IP operates as a two-layer protocol. The top layer, TCP, manages the assembling of a message or file into smaller packets that are transmitted over the Internet and received by a TCP layer that reassembles the packets into the original message. The lower layer, IP, handles the address part of each packet so that it gets to the right virtual destination. Each gateway computer on a network checks this address to determine where to forward the message. Even though some packets from the same message may be routed differently than others, all of the packets are reassembled at the virtual destination.

The higher-layer applications (e.g., HTTP, FTP, etc.) utilize TCP/IP in the client/server model of communication in which a computer user (i.e., a client) requests and is provided a service (e.g., sending a Web page) by another computer (e.g., a server) in the network. TCP/IP communication is primarily point-to-point, which means each communication is from one point (or host computer) in the network to another point (or host computer) in the network. TCP/IP and the higher-layer applications (e.g., HTTP, FTP, etc.) that use it are collectively said to be "stateless" because each client request is considered a new request unrelated to any previous one (unlike ordinary phone conversations that require a dedicated connection for the call duration). Being stateless frees network paths so that clients and servers can use them continuously. The TCP layer itself is not stateless with respect to an individual message because a connection must remain in place at least long enough for all packets in a message to be received.

In the above-described operating environment, mobile computing devices such as PDAs and mobile smart phones typically interface with the public Internet as web clients that access, request and receive content from web servers. However, as the technology of mobile computing devices improves, users store more and more information on such devices, and it has become desirable to provide a way to route web clients to mobile computing devices over an IP network. In addition to mobile smart phones, PDAs, laptops and tablets, there are other mobile computing devices that are not typically accessed physically by a human user. Examples of such mobile computing devices include tracking devices, automated meter readers and control units that automatically turn on or off heaters and the like in the home. Communication with these mobile/remote computing devices is typically referred to as Machine-to-Machine (M2M) because the interface to retrieve data is typically another remote machine. Because mobile/remote computing devices operating in an IP network will typically have dynamically assigned addresses that change at regular or random times for any number of reasons, any attempt to route to and access content from such computing devices over the public Internet must overcome the limitation that a client-server internet connection to a dynamically assigned address can be unstable and unreliable.

The disclosed embodiments address the above-described limitation in a simple and cost effective way by providing, among other features, intermediary routing systems and methods that reliably route a web client to a mobile computing device (e.g., mobile smart phone, PDA, laptop, tablet, tracking device, etc.) having a dynamically assigned addresses that can change. The disclosed embodiments can assist in minimizing expense, engineering man-hours and design complexity by utilizing commercially available systems, and by making targeted and relatively easily implemented configuration-type changes to existing software processes. Thus, the disclosed intermediary routing systems and methods facilitate the implementation of a variety of useful systems that allow access to and utilization of both the content and functionality of the dynamically addressed device. For example, implementation of the disclosed intermediary routing system provides a user with reliable remote access, subject to user-configurable constraints, to the user's dynamically addressed device. Such remote access may be accomplished without requiring others to have any special hardware or software but, instead, requiring no more than a conventional web browser such as Internet Explorer®, Safari®, Firefox® or Chrome®.

According to one exemplary embodiment, the disclosed intermediary routing system and method is implemented in a communications system in which mobile computing devices within a private IP network are connected wirelessly through a firewall network server to the public Internet. The firewall network server performs a conventional security function for the private IP network. For the disclosed embodiment, the firewall network server is configured in a conventional manner to allow the communications described herein to occur between components in the public Internet and components in the private IP network. Preferably, the firewall network server includes a stable and reliable statically addressed URL accessible by web clients that wish to access the mobile computing devices. A web client, which is typically a conventional computer (e.g., PC, Mac or another platform), is connected to the public Internet and has a web browser for participating via HTTP protocol as a client in a client-server session. The web client further includes a client-local proxy-server, which may be housed with or separate from the web client. Where the client-local proxy-server is housed with the web client, a single device (e.g., a PC, Mac or another platform) houses both the above-described web client functionality and the above-described client-local proxy-server functionality. Under either scenario, the client-local proxy-server includes proxy-server software and is connected to the public Internet. The client-local proxy-server software is preferably TCP/IP proxy-server software, which utilizes the basic communication protocol of the Internet. Preferably, the proxy-server software's functionality may be readily and relatively inexpensively configured by adding extensions, scripts and the like to the proxy-server software. The mobile computing device may be, for example, an iPhone® or Blackberry® having a processor, general operational software, instruction memory and data memory. The mobile computing device has a dynamically assigned address that can change. In addition to the previously described general operational software, the mobile computing device further includes conventional hardware and mobile web server software (e.g., Apache®) that allows the mobile computing device to host an HTML website and participate as a server in a client-server session, once established, with the client web browser via the client-local proxy-server. Preferably, the mobile server software is substantially non-proprietary. The term substantially non-proprietary is used here to describe that the mobile web server software's functionality may be readily and relatively inexpensively configured by adding extensions, scripts and the like to the mobile web server's software. Preferably, the mobile web server software further includes sufficient functionality to allow the web client to access mobile computing device content. Additional details of the interface between the mobile computing device's mobile web server software and the mobile computing device's general operational software are disclosed in the previously referenced Provisional Applications and co-pending U.S. Patent Application, namely Provisional Application No. 61/452,031 entitled "REMOTE MOBILE ADMINISTRATION AND LOGGING USING HTTP PROTOCOL," filed Mar. 11, 2011, and assigned to the assignee hereof and hereby expressly incorporated by reference herein; Provisional Application No. 61/588,007 entitled "REMOTE ACCESS AND ADMINISTRATION OF DEVICE CONTENT AND CONFIGURATION USING HTTP PROTOCOL," filed Jan. 18, 2012, assigned to the assignee hereof, and expressly incorporated by reference herein; and co-pending U.S. patent application Ser. No. 13/415,636 entitled "REMOTE ACCESS AND ADMINISTRATION OF DEVICE CONTENT AND CONFIGURATION USING HTTP PROTOCOL," filed concurrently herewith, assigned to the assignee hereof, and expressly incorporated by reference herein.

According to the disclosed intermediary routing system and method, the following configurations are implemented in the mobile web server software and the client-local proxy-server software of the above-described communications system. A feature of the disclosed embodiment is that the configurations described herein do not require the creation of new mobile web server software or new proxy-server software. Instead, the configurations are implemented by conventional extensions, scripts and the like applied to existing mobile web server software and existing proxy-server software. The mobile web server software is configured to generate, store and transmit device identification data (DID) that will uniquely identify the mobile computing device's virtual location on the public Internet to the client-local proxy-server. In operation, DID is a pair of identifiers in which one (the "search key") is used to find the other (the "search result"). Thus, at a minimum, DID includes address data (i.e., the search result) such as the device's IP address, along with a device identifier (i.e., the search key), which, for a mobile computing device that is a smart phone, may be a ten-digit telephone number. Thus, where the mobile computing device is a mobile smart phone, the mobile device DID can be the smart phone's ten-digit phone number together with the current version of the mobile device's dynamic address. Other examples of device identifiers include a "Mobile ID Number" (MIN), an "International Mobile Subscriber Identity" (MDN), an "International Mobile Equipment Identity" (IMEI), or any other ID that is unique to each mobile computing device sharing a mobile network. Under the disclosed intermediary routing system and method, the mobile computing device is configured to register its DID with the client-local proxy-server, and to send updates of its DID to the client-local proxy-server when the dynamic address component of its DID changes or at predetermined intervals.

Further according to the disclosed intermediary routing system and method, the client-local proxy-server functionality is configured to receive and store DID received from the mobile computing device, including specifically any updates to the mobile computing device DID. The client-local proxy-server is further configured to perform an intermediary function, whereby requests received at the client-local proxy-server to access the mobile computing device are routed through the client-local proxy-server to the current mobile computing device address using DID stored at the client-local proxy-server. The client-local proxy-server typically receives the above-described request from a web client, which is preferably a conventional web browser (not shown) or any hardware/software component capable of serving as the client side of a client-server session over a communications system. The web client preferably reaches the client-local proxy-server by configuring its web browser to use the proxy-server to transmit requests from the web client. Alternatively, the proxy-server could be configured to include a statically addressed URL accessible by web clients that wish to access the mobile computing device. The proxy-server URL takes any request and automatically forwards it to the client-local proxy-server (preferably after user authentication, etc.), and the client-local proxy-server employs the mechanisms of the disclosed embodiments to further forward the request to the mobile computing device. The client-local proxy-server is even further configured to listen on its URL via the parallel or serial bus connection that the web client uses for HTML communication.

In general, communications networks employ proxy-servers when it is desired to allow web clients to make indirect network connections to other network services. The web client connects to the proxy-server then requests a connection, file, or other resource available on a different server, which in the disclosed embodiment is the mobile computing device. The client-local proxy-server disclosed herein is preferably capable of being configured (e.g., through adding scripts, extensions, etc to existing proxy-server software) without requiring extensive engineering man-hours. The disclosed client-local proxy-server is configured to perform its intermediary connection function by using stored DID, whereby requests received at the client-local proxy-server to access a mobile computing device are relayed to the current mobile computing device address using the current DID stored at the client-local proxy-server. The client-local proxy-server provides the requested resource either by connecting to the mobile computing device web server or by serving the requested resource from a cache. In some cases, the client-local proxy-server may alter the web client's request or the server's response for various purposes.

Figure 1:
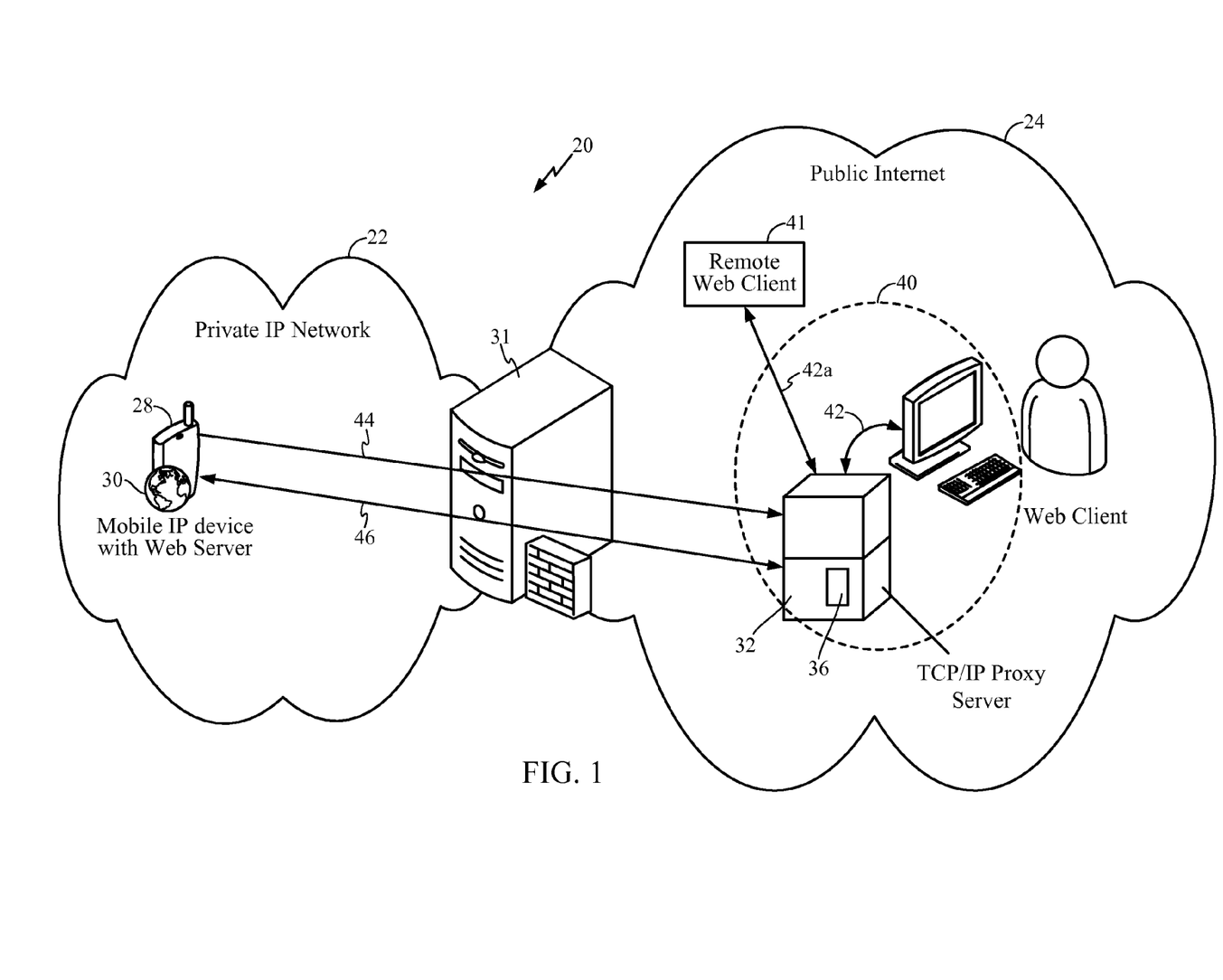
FIG. 1 is a diagram of the disclosed embodiment.

Thus, the client-local proxy-server of the disclosed embodiment acts as an intermediary for requests from the web client to the mobile computing device. The client local proxy-server includes at least one static address that does not ordinarily change. Thus, the client-local proxy-server hardware also includes the functionality of a conventional web server host device that can be reliably accessed by another device (e.g., the web client) connected to the public Internet. As previously described, the client-local proxy-server includes proxy-server software, along with a database that may be a separate device or housed with the proxy-server hardware. As previously described, the web client is preferably a conventional web browser (not shown) or any hardware/software component capable of serving as the client side of a client-server session over a communications system. The web client may be operated by a human user, or it may be operated by an automated tool/script/machine that uses the HTTP protocols (or others) to automatically access HTTP (or other) servers. Such automated tools are usually referred to as "HTTP agents." Various data flow paths are illustrated in FIG. 1 by directional arrows 44 and 46, which represent communication between and among the mobile computing device, the network firewall server, the client-local proxy-server, the database and the web client.

The overall operation of an intermediary routing system and method according to the disclosed embodiment will now be described. To better understand the operation of the intermediary routing system and method, it is useful to keep track of three IP addresses. One is the IP address of the mobile computing device, which IP address is dynamically assigned and can change. A second is the IP address of the firewall server that provides access to the private IP network and the mobile computing device. Preferably, the IP address of the private network's firewall server is a statically assigned IP address reliably accessible by web clients that wish to access the mobile device. A third is the IP address of the client-local proxy-server functionality at the web client. The client-local proxy-server IP address is preferably a statically assigned IP address reliably accessible by web clients that wish to access the mobile computing device.

Continuing with the overall operation of the disclosed intermediary routing system and method, a web client wishing to access the mobile computing device communicates through the client-local proxy-server a request to participate as a client (preferably via HTTP protocol) in a client-server session with the mobile computing device. The client-local proxy-server functionality is preferably local to the web client. Additionally, a remote web client may access the client-local proxy-server functionality remotely using the remote web client's web browser and the local client-local proxy-server IP address. The web client's request includes the previously described "device identifier," which allows the client-local proxy-server to uniquely identify a particular mobile computing device. For example, where the mobile computing device is a mobile phone, the device identifier can include at least the mobile computing device's unique ten-digit phone number. To fulfill the request, the client-local proxy-server must now identify the virtual location of the mobile computing device. Identifying the virtual location of the mobile computing device is made more complicated by the fact that the mobile computing device IP address is dynamic, so it is subject to change at any time for a variety of reasons related primarily to the mobile computing device's mobility, wireless connection and the requirements of its communications network. Thus, according to the disclosed intermediary routing systems and methods, the mobile computing device is configured such that when the mobile computing device IP address changes it sends an update of its current IP address (i.e., the previously described device address), along with its search key (i.e., the previously described device identifier) to the client-local proxy-server functionality via the private network firewall server, or via some other communications path. Alternatively, the mobile computing device can send its current DID at select intervals whether or not the IP address component of DID has actually changed. Under either approach, the client-local proxy-server receives, stores and maintains as DID the current IP address of the mobile computing device.

Upon receiving a request to participate in a client-server session the client-local proxy-server compares in a conventional manner the request to the DID stored at the client-local proxy-server. If there is a match between the request and stored DID (i.e., the "search key" of the request matches the "key" portion of a stored DID), the client-local proxy-server extracts the current mobile computing device address from the stored DID and forwards the request for a client-server session and the current mobile computing device IP address to the private network firewall server IP address. The private network firewall server uses the current mobile computing device IP address to locate the mobile computing device and connect the client-local proxy-server and the web client (which is either local or remote) to the mobile computing device address, thereby opening a client-server session. Once the client-server session is established, the client-local proxy-server uses conventional proxy intermediary routing techniques to conduct an indirect client-server session between the web client and the mobile computing device through the client-local proxy-server and the private network firewall server.

Under conventional network operation, the network should not ordinarily change the mobile computing device's dynamic address as long as the above-described client-server session is active. If for some reason the network changes the mobile computing device dynamic address during the client-server session, a re-connect of the client-server session must be initiated through the web client sending a new request. However, to facilitate such a re-connect, the current mobile computing device DID is available at the client-local proxy-server, and the client-local proxy-server can therefore react quickly to a subsequent re-connect request.

Thus, the intermediary routing systems and methods of the disclosed embodiment facilitate the implementation of a variety of useful systems to provide access to and utilization of both the content and functionality of dynamically addressed devices. For example, upon implementation of the disclosed intermediary routing system, a broader system may be implemented wherein a user can provide a potentially unlimited number of others, subject to user-configurable constraints, with reliable remote access to the user's dynamically addressed mobile computing device (e.g., a mobile smart phone, PDA, laptop, tablet, etc.). Such remote access may be accomplished without requiring others to have any special hardware or software but, instead, requiring no more than a conventional web browser such as Internet Explorer®, Safari®, Firefox® or Chrome®. In one example process according to an exemplary embodiment, a mobile web page hosted on the mobile computing device can be configured in a conventional manner to make a particular content, for example a set of pictures taken on a vacation, accessible to a browser viewing the mobile web page. For example, the mobile web page could include a click field, having text or graphics according to conventional HTML coding that appear as "Rob's Beach Vacation, 2010." A user or web client at a PC or mobile computing device connected to the public Internet who wishes to access this "Rob's Beach Vacation, 2010" content of the mobile computing device types the client-local proxy-server URL into his/her web browser field and hits "enter" or "send." The client-local proxy-server takes the web client to a particular web page where the web client enters any authorization data required by the user, and, upon authorization, requests access to the mobile computing device by providing, for example, the ten-digit phone number associated with the mobile computing device. The client-local proxy-server, following the intermediary routing system and methods described above, uses the ten-digit phone number to search for and fetch the mobile computing device IP address currently stored at the client-local web proxy-server, then routes the web client through the client-local URL into indirect or virtual communication with the mobile computing device. The web client may now access photos stored on the mobile computing device though the mobile web page "Rob's Beach Vacation, 2010."

From the forgoing overview and example, it can be seen that the disclosed embodiments of the intermediary routing systems and methods can, among other features and benefits, assist in minimizing expense, engineering man-hours, design complexity and the need for access to proprietary systems by implementing the intermediary routing system and methods with commercially available and substantially non-proprietary components (e.g., mobile computing devices, web clients, web browsers, etc.), and making targeted and relatively easily implemented configurations to those components (e.g., the mobile computing device and proxy-server functionalities configured as described above).

Turning now to a more detailed description of the intermediary routing system and methods of the disclosed embodiment, FIG. 1 illustrates a communications system 20 that includes a private IP network 22 in communication with the public Internet 24 through a firewall server 31. Firewall server 31 serves a conventional security function for private IP network 22. For the disclosed embodiment, firewall server 31 is configured in a conventional manner to allow the communications described herein to occur between components in public Internet 24 and components in private IP network 22. Firewall server 31 preferably has a static IP address that does not change. A mobile computing device 28 connects to and communicates with system 20. Mobile computing device 28 may be a cellular phone, a handheld PDA, a tablet, a laptop computer, tracking device or the like, and may communicate with system 20 wirelessly and/or through hardwires or cables. Mobile computing device 28 includes sufficient functionality to allow a web client 40 to remotely access the mobile computing device's content and features (e.g., retrieving images, graphics and other information from mobile computing device 28) once a client-server session has been established between web client 40 and mobile computing device 28. One example of such device functionality includes mobile computing device web server software 30 that provides mobile computing device 28 with the functionality of a conventional host device and internet website. In general, websites are hosted on web server hardware, and web server software resides on the web server hardware. Web server software provides a mechanism for external client web browsers to retrieve images, graphics and other information from the web server hardware. The address of mobile computing device 28 may be dynamically assigned.

Although FIG. 1 shows a single private IP network 22, the disclosed embodiments may be implemented in a communications system having several private IP networks (e.g., Verizon®, AT&T®, etc.) that interface with the public Internet 24. Further, although a single mobile computing device 28 is shown, it is understood that each private IP network 22 includes numerous mobile computing devices. The device identifier (i.e., the "search key" component of DID) of mobile computing device 28 is globally unique, and the IP address (i.e., the "search result" component of DID) of mobile computing device 28 is globally unique within private IP network 22. The disclosed embodiments may also be implemented in a communications system wherein all of the components (mobile computing devices, client-local proxy-servers, web clients, etc.) are in the public Internet 24.

Communications system 20 further includes client-local proxy-server functionality 32 that may be implemented locally at web client server 40. Client-local proxy-server 32 includes proxy-server software 34 and a database 36. Client-local proxy-server 32 and client-local proxy-server software 34 may be housed with web client 40, or may be implemented as a stand-alone device having a local communication path 42 between web client 40 and client-local proxy-server 32, 34. Database 36 may be housed with client-local proxy-server 32 or may be separate from client-local proxy-server 32. Preferably, client-local proxy-server 32 has a static address that does not ordinarily change. A remote web client 41 may use its web browser to access client-local proxy-server 32 at its static address, shown diagrammatically by communication path 42a. Thus, client-local proxy-server 32 has the functionality of a conventional server host device that can be reliably accessed by another device (e.g., web client 40 or a remote web client 41) connected to public Internet 24. Further, client-local proxy-server 32 provides the functionality of a conventional proxy-server. In general, proxy-servers allow clients to make indirect network connections to other network services. A client connects to the proxy-server then requests a connection, file, or other resource available on a different server. The proxy-server provides the requested resource either by connecting to the specified server or by serving it from a cache. In some cases, the proxy-server may alter the client's request or the server's response for various purposes.

Web client 40 is preferably a conventional web browser (not shown) or any hardware/software component capable of serving as the client side of a client-server session over communications system 20. The web client 40 may be operated by a human user, or it may be operated by an automated tool/script/machine that uses the HTTP protocols (or others) to automatically access HTTP (or other) servers. Such automated tools are usually referred to as "HTTP agents." Various data flow paths are illustrated in FIG. 1 by directional arrows 42, 44 and 46, which represent communication between and among mobile computing device 28, firewall server 31, client-local proxy-server 32, database 36, web client 40 and remote web client 41.

The systems and methods of the disclosed embodiments reliably open a data path between web client 40 (or remote web client 41) and a mobile computing device (e.g., mobile computing device 28) having a dynamically assigned address. An important aspect of the disclosed systems and methods is that many of the components (e.g., mobile computing device, mobile web server software, databases, web client browsers, etc.) are commercially available and substantially non-proprietary items. The disclosed embodiments call for certain configuration-type changes to select components, and examples of such configurations (e.g., methodologies 50, 70) are diagrammed in FIGS. 2 and 3. However, the added functionality provided by the disclosed configuration changes are targeted and may be implemented through known design techniques (e.g., adding extensions, scripts and the like to existing software) that are within the capability of one having ordinary skill in the relevant art.

Figure 2:
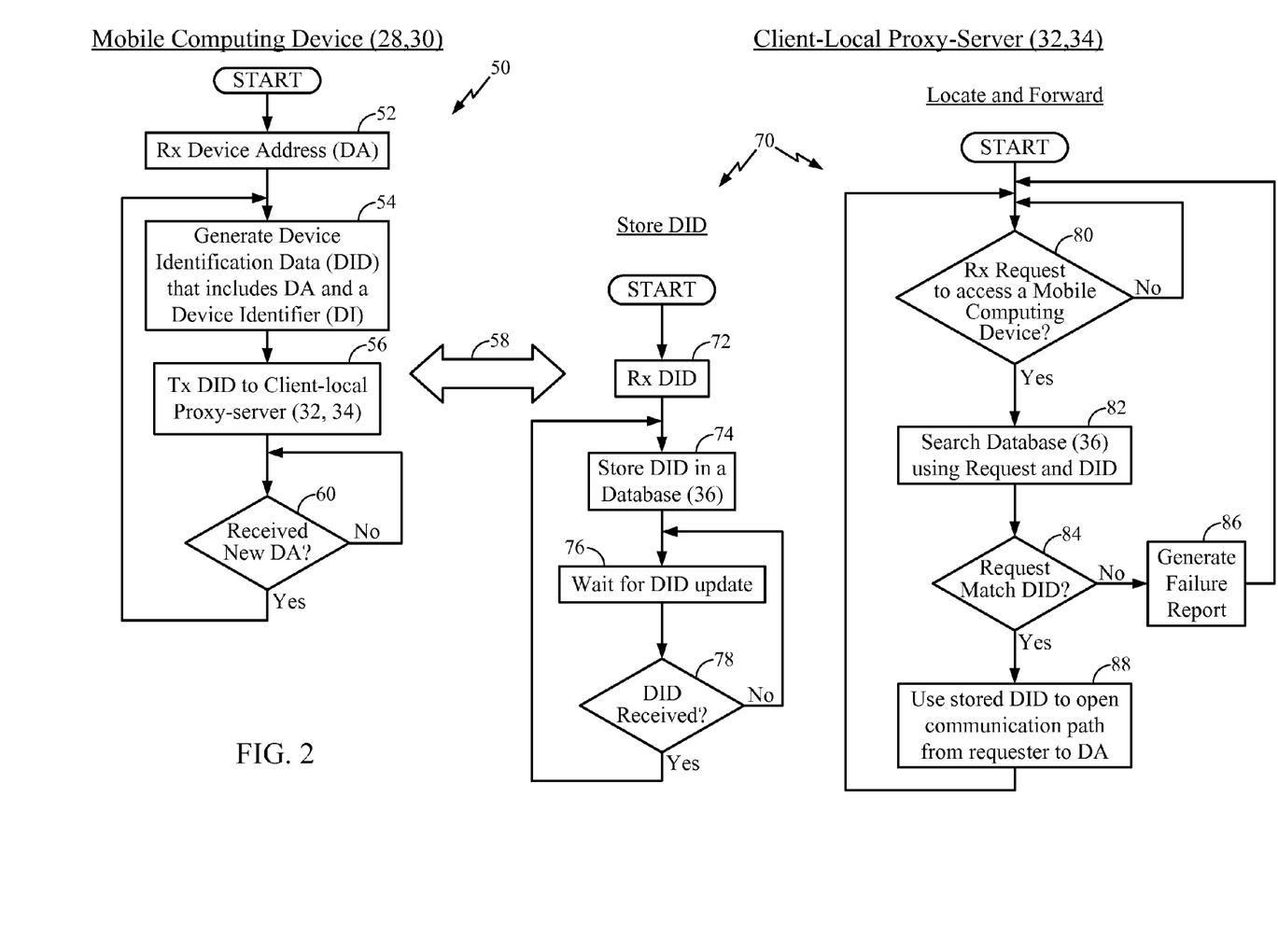
FIG. 2 is a flow diagram illustrating methodologies provided in the mobile computing device 28, 30 and the client-local proxy-server 32, 34 shown in FIG. 1.

According to the disclosed embodiments, mobile computing device web server software 30 is configured to include functionality, illustrated by mobile computing device methodology 50 in FIG. 2, whereby mobile computing device 28 communicates DID (previously described "device identification data"), which includes the mobile computing device's current IP address and device identifier, to client-local proxy-server hardware 32. Client-local proxy-server hardware 32 includes client-local proxy-server software 34 configured to provide functionality, illustrated by client-local proxy-server methodology 70 (also shown in FIG. 2) whereby client-local proxy-server hardware 32 receives from mobile computing device 28 periodically updated DID, which includes the mobile computing device's IP address. Client-local proxy-server hardware 32 stores the current DID of mobile computing device 28 in database 36. As previously described, DID also includes a device identifier (or "search key"), which can be a convenient identifier that is easily remembered and typed (e.g., "johndoephone", or "555-123-4567") and functions similarly to a website domain name. Because client-local proxy-server 32 interfaces between web client 40 in public Internet 24 and mobile computing device 28 in private IP network 22 (as well as other mobile computing devices in other private IP networks—not shown), the device identifier is globally unique. Client-local proxy-server 32 includes a URL (not shown) that can receive a request (typically via a web client browser) to access device 28 from web client 40 or remote web client 41. Client-local proxy-server 32 may be housed with web client 40, or may be situated locally with web client 40 such that it communicates with web client 40 via a local data communication path 42 (which may be wired or wireless). Also, client-local proxy-server 32 has a static address, which allows remote web client 41 to establish a reliable internet connection to the client-local proxy-server.

Turning now to FIG. 2 there are illustrated flow diagrams showing the operation and interaction of mobile computing device methodology 50 and client-local proxy-server methodology 70. The methodologies 50, 70 may be embodied directly in hardware, in a software module executed by a processor (e.g., a script running in a script interpreter or a virtual machine), or in any combination thereof. Methodology 50 is implemented by mobile computing device web server software 30 in mobile computing device 28, and methodology 70 is implemented by client-local proxy-server software 34 in client-local proxy-server 32. As shown in FIG. 2, at block 52 of methodology 50, mobile computing device 28 receives in a conventional manner a device address (DA) from a network entity within communications system 20 shown in FIG. 1. If, for example, system 20 includes a CDMA network, the DA would be the device IP address assigned by a Packet Data Serving Node (PDSN) (not shown). Methodology 50 at block 54 generates DID that includes the device address (DA) and a unique device identifier (DI) for that device. The unique device identifier (previously described as the "search key") can be a convenient identifier that is easily remembered and typed (e.g., "johndoephone", or "555-123-4567") and can function similarly to a website domain name. Block 56 transmits DID via communications path 58 to the client-local proxy-server 32. Communications path 58 in FIG. 2 is a virtual representation of a variety of ways to pass DID from the mobile computing device 28, 30 to the client-local proxy-server 32, 34. For example, communications path 58 could be implemented via the communications link established by data flow path 44 shown in FIG. 1. Alternatively, communications path 58 could be achieved by having the mobile computing device run a small "automated" web client, and using that automated web client to communicate DID to the client-local proxy-server. The automated web client could browse to a designated page in the client-local proxy-server, wherein the page includes a form that asks the mobile computing device to "please submit your DID and press the SUBMIT button." The automated web client "fills in" the form and presses submit. The client-local proxy-server then receives DID and stores it. Methodology 50 queries at decision block 60 whether mobile computing device 28, 30 has received an updated device address. If methodology 50 determines at decision block 60 that a new device address has not been received, the methodology returns to the input to block 60 and repeats the inquiry. When methodology 50 determines at decision block 60 that a new device address has been received, the methodology returns to the input to block 54, generates new DID that includes the updated device address, and transmits via communications path 58 the updated DID to client-local proxy-server 32, 34. Decision block 60 may be triggered in a variety of ways such as detecting whether the DA has actually changed, or based on a timer function that periodically updates and transmits DID to client-local proxy-server 32, 34 even if the DA component of the DID has not actually changed.

Turning now to client-local proxy-server methodology 70, methodology 70 includes two major components identified in FIG. 2 under the headings "Store DID" and "Locate and Forward." In the Store DID component of methodology 70, Block 72 receives via communications path 58 current and updated DID from a variety of mobile computing devices, which includes DID from mobile computing device 28. The DID received at block 72 includes the current and updated address (DA) and unique device identifier (DI) for each of the various mobile computing devices in communication with client-local proxy-server 32, 34. Block 74 stores the received DID in database 36, then waits at block 76 to receive any DID updates. Decision block 78 checks to determine if updated DID has been received. If no updated DID has been received, methodology 70 returns to the input to block 76 and waits for DID updates. If at decision block 78 an updated DID has been received, methodology 70 returns to the input to block 74 and stores the received updated DID in database 36.

Turning now to the "Locate and Forward" portion of methodology 70, client-local proxy-server 32, 34 includes a "start" or "home" web page (not shown) that functions as the virtual location or URL for receiving requests from web clients (typically via the web client's browser) to access a mobile computing device. The client-local proxy-server start page has a static address, which allows web client 40 to reliably and consistently establish an internet connection to the page. Methodology 70 evaluates at decision block 80 whether a request to access a mobile computing device has been received at the client-local proxy-server start page. If a request has not been received, decision block 80 returns to its input and repeats the inquiry. If a request to access a mobile computing device has been received at decision block 80, block 82 in accordance with the disclosed embodiment extracts a device identifier from the request and searches database 36 to compare the extracted device identifier to DID stored in the client-local proxy-server 32 (via database 36). Methodology 70 evaluates at decision block 84 whether the extracted device identifier matches a stored DID entry. If no match is found, block 86 generates a failure report and returns to the input to decision block 80. If at decision block 84 the extracted device identifier matches a stored DID entry, block 88 uses the device address component of the matched DID to open a communication path from the requester (e.g., web client 40 or remove web client 41) through firewall server 31 to the mobile computing device web server 28, 30. Acting as an intermediary, client-local proxy-server 32 relays requests from the static address of the client-local proxy-server URL "start" or "home" page to the currently stored address of mobile computing device 28. Accordingly, methodologies 50 and 70 work together to ensure that the current version of each assigned address of the mobile computing devices (e.g., mobile computing device 28) in private IP network 22 are available at the database 36.

The intermediary operation at block 88 is applied in a novel manner under the disclosed embodiment, and it may be implemented in a variety of ways, including but not limited to the following:

a. The client-local proxy-server can pass the request "as-is" (thus be a "transparent" proxy).
    b. The client-local proxy-server can translate the request depending on its content: e.g. from "my_long_url_name.html" to "p12.htm". Such translation might require further editing of the reply content.
    c. The client-local proxy-server can filter requests depending on their content: e.g. allow request for "index.html" but deny request for "data.txt".
    d. The client-local proxy-server can route requests depending on their content: e.g. send the requests to different end web-servers and not necessarily to the mobile web-server. This causes the request to appear to be replied to only from the mobile web-server, while actually it is being replied to from several sources. The benefits of using this approach include:
  (i) Lower network usage: data that is not mobile-specific, or data that is changed infrequently could be stored at any web server and retrieved without using mobile bandwidth, for example pictures and client side scripts.
  (ii) Store historical or offline data: some data can be moved from the mobile memory to a web server (e.g. old records). When requested, this data can be retrieved from the offline server and not the mobile web server. Also, such records will be available even if the mobile computing device is turned off or not within network coverage.

Figure 3:
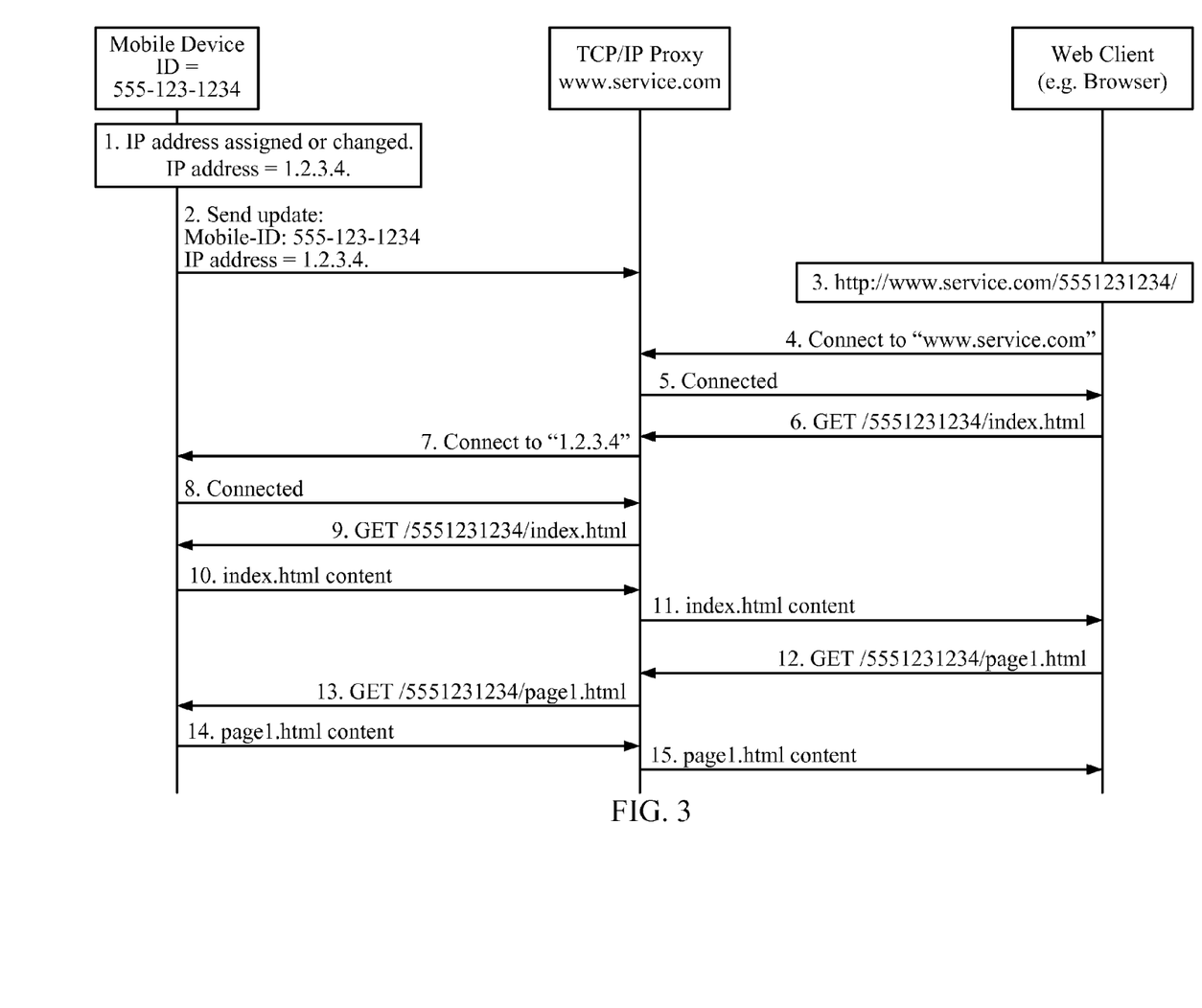
FIG. 3 is a specific example of the operational steps performed by the embodiment shown in FIG. 1.

FIG. 3 is a more detailed example of the operational steps performed by the embodiment shown in FIG. 1. In this example, the client-local proxy-server is a TCP/IP proxy-server. The operational steps shown in FIG. 3 are numbered 1 through 15 and described below.

Step 1—a mobile device is assigned an IP address. This is done after the mobile device is powered on and at various times as determined by the needs of the particular network. Thus, the IP address can change from time to time. In FIG. 3, the IP address is represented as "1.2.3.4." This is not an actual IP address and is used in this example for illustration purposes only. Although the examples disclosed herein utilize IPv4 address formats, the disclosed embodiments also apply to other addressing schemes such as IPv6.

Step 2—the mobile device implements the methodology 50 shown in FIG. 2 to send to the client-local TCP/IP proxy-server an update of the mobile device's DID (previously described "device identification data"). In this example, the mobile device DID includes a Mobile-ID (previously described "device identifier") and the new IP address. Step 2 may be accomplished in several ways. For example, the mobile device can communicate with the client-local TCP/IP Proxy-server using HTTP protocols and could therefore use the HTTP "POST" or "GET" methods to submit the information. The client-local TCP/IP proxy-server using web server-side-scripting will store this information in a database (DB). Alternatively, the mobile device could communicate with the DB using a proprietary protocol based on IP communication.

Step 3—a public internet user activates a web browser and types the port address of the "proxy port" (e.g., "http://www.service.com,") of the client-local TCP/IP Proxy-server, along with the Mobile-ID, e.g. "5551231234," and clicks "enter."

Step 4—The client-local TCP/IP proxy-server (running in, under, or in association with the web browser and listening to the proxy port) detects the user's entry. It should be noted that, where the client-local TCP/IP proxy-server is housed with the web client, the proxy-server's functionality may be installed so that the web browser itself needs no modification, and does not need to know that the TCP/IP proxy-server is local.

Step 5—the "connection" between the web browser and the TCP/IP proxy-server is established.

Step 6—the web browser "sends" an HTTP GET request to the TCP/IP proxy-server. The client-local TCP/IP proxy-server extracts Mobile-ID from the HTTP GET request and uses it to query the DB and convert the Mobile ID to the mobile IP address.

Steps 7, 8, 9 and 10—the client-local Proxy-server sends an HTTP GET request to the mobile web server and the requested content is sent from mobile web server to the client-local TCP/IP proxy-server. This could be accomplished in several conventional ways:
  a. The client-local proxy-server could pass the request "as-is": thereby operating as a "transparent" proxy.
  b. The client-local proxy-server can translate the request depending on its content: e.g. from "my_long_url_name.html" to "p12.htm". Such translation might require a further edition of the reply content.
  c. The client-local proxy-server can filter requests depending on their content: e.g. allow request for "index.html" but deny request for "data.txt".
  d. The client-local proxy-server can route requests depending on their content: e.g. send the requests to different end web-servers and not necessarily to the mobile web-server. This causes the requests to appear to be replied to only from the mobile web-server, while actually they are being replied to from several sources. The benefits of using this approach include:
    (i) Lower network usage: data that is not mobile-specific, or data that is changed infrequently could be stored at any web server and retrieved without using mobile bandwidth, for example pictures and client side scripts.
    (ii) Store historical or offline data: some data can be moved from the mobile memory to a web server (e.g. old records). When requested, this data can be retrieved from the offline server and not the mobile web server. Also, such records will be available even if the mobile device is turned off or not within network coverage.

Step 11—The TCP/IP proxy server sends the requested content (either "as-is" or changed) back to the web client. To the user of the web client, the experience is seamless.

Steps 12, 13, 14 and 15—the web client issues another HTTP request that the TCP/IP proxy-server transfers to the mobile web server. The reply from the mobile web server is then transferred to the web client.

Note that the above-described steps, particularly Steps 2 and 7-10, allow the user to contact a mobile web server having an IP address that can dynamically change in a way that is "seamless." The web client needs no special customization (other than the proxy-server functionality), and the user experience is "natural" because the user's interaction with the mobile web server appears no different from the typical experience at a static website.

While the foregoing disclosure shows illustrative embodiments of the invention, it should be noted that various changes and modifications could be made herein without departing from the scope of the invention as defined by the appended claims. For example, the functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

Additionally, the "user" described herein includes both human operators and an automated tool/script/machine that uses the HTTP protocol (or other) to automatically access HTTP (or other) servers. Such automated tools are usually referred to as "HTTP agents."

The term "IP address" is used in its broadest sense to describe how the public internet identifies a host device. Accordingly, the term IP address includes currently known methods of identifying a device on the internet, as well as device identification methods that may be developed and/or used in the future. Also, while it is advantageous to include an easy to remember device identifier with the DID, it is not a requirement that the device address is coupled with a device identifier.

The mobile computing device 28 updates the client-local proxy-server 32 when the mobile computing device's IP address is assigned or changed. Alternatively, when the device address is assigned or changed, the network entity that assigns the address can update the client-local proxy-server 32.

The specific example in FIG. 3 uses a mobile-id-number (e.g. "555-123-1234") as the device identifier. A more complex scheme of device IDs could be used, with two (or more) hierarchies. Using a database (e.g., database 36) in the system, the following schemes could be implemented:

1. The mobile computing device updates the database with its address and device identifier, which could be a "Mobile ID Number" (MIN); an "International Mobile Subscriber Identity" (MDN); an "International Mobile Equipment Identity" (IMEI); any other ID that is unique to the mobile-devices sharing a mobile network; or
2. When the user connects to the client-local proxy-server URL using any kind of ID (e.g. a "Username" and "Password"), that ID can be translated into the IP address of the mobile computing device.

Further, those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the relevant arts will also appreciate that the various illustrative logical blocks, modules, circuits, methodologies and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences, and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. Accordingly, an embodiment of the invention can include a computer readable media embodying a method for performing the disclosed and claimed embodiment. Accordingly, the invention is not limited to illustrated examples and any means for performing the functionality described herein are included in embodiments of the invention.

What is claimed is:

1. A method of accessing a device having an assigned address, comprising:
   storing the assigned address in a memory location;
   receiving at a client-local proxy-server a request to access the device;
   said request comprising a device identifier that uniquely identifies the device; and
   in response to said request to access the device, identifying the device's stored address based on said device identifier, said proxy-server acting as an intermediary to establish a data path between a sender of said request and said device, based on said stored address.

2. The method of claim 1 further comprising:
   said assigned address comprises a dynamically assigned address; and
   receiving and storing in said memory location an updated dynamically assigned address.

3. The method of claim 2, wherein said device identifier comprises a telephone number, a Mobile ID Number, an International Mobile Subscriber Identity or an International Mobile Equipment Identity.

4. The method of claim 1 wherein said client-local proxy-server comprises a TCP/IP proxy server.

5. The method of claim 1 wherein:
   said client-local proxy-server comprises a URL having a static address; and
   said request is received at said URL.

6. The method of claim 1 wherein:
   said device comprises a mobile device having web server software; and
   said data path comprises a client-server session.

7. A method comprising:
   receiving at a device an assigned address that identifies a virtual location of said device on a network;
   said device configured to transmit said received assigned address to a client-local proxy-server that receives a request to access said device from a web client;
   said request comprising a device identifier that uniquely identifies said device; and
   delivering data from said device to said web client over a communications path established by said client-local proxy-server using said assigned address to act as an intermediary between said web client and said device.

8. The method of claim 7 comprising:
   said assigned address comprises a dynamically assigned address; and
   transmitting to said client-local proxy-server an updated assigned address in response to said assigned address changing.

9. The method of claim 7, wherein said device identifier comprises a telephone number, a Mobile ID Number, an International Mobile Subscriber Identity or an International Mobile Equipment Identity.

10. The method of claim 7 further comprising:
    said device comprises a mobile device having web server software; and
    said communications path comprises a client-server session.

11. An apparatus for opening a communications path to a device, the apparatus comprising:
    a client-local proxy-server that receives an address assigned to the device and stores said assigned address in a memory location;
    said client-local proxy-server including a URL that receives a request to access the device;

said request comprising a device identifier that uniquely identifies the device; and said client-local proxy-server in response to said request to access the device, identifying the device's stored address based on said device identifier, and acting as an intermediary to open a communications path between a sender of said request and said device, based on said stored assigned address.

12. The apparatus of claim 11 wherein:

said device comprises a mobile device having web server software; and said communications path comprises a client-server session.

13. The apparatus of claim 11 wherein:

said client-local proxy-server comprises web proxy-server software; and said web proxy-server software is configured to identify the device's stored assigned address based on said device identifier, and open said communications path between said sender of said request and said stored assigned address.

14. A system comprising:

a device that receives an assigned address identifying a virtual location of said device on a network;

said device comprising commercially available and substantially non-proprietary mobile web server software configured to transmit said assigned address to a client-local proxy-server that receives requests to access said device from a web client;

said requests comprising a device identifier that uniquely identifies said device; and said mobile web server software further configured to deliver data from said device to said web client over a communication link established by said client-local proxy-server acting as an intermediary between said web client and said device based on said assigned address.

15. The system of claim 14, wherein said mobile web server software is further configured to transmit to said client-local proxy-server an update of said assigned address in response to said assigned address changing.

16. The system of claim 15 wherein said mobile web server software is further configured to:

associate said device identifier with said assigned address; and transmit said device identifier and said assigned address to said client-local proxy-server.

17. The system of claim 16 wherein said communication link comprises a client-server session.

18. The system of claim 16 wherein said web client comprises a remote web client this is remotely located from said client-local proxy-server.

* * * * *